United States Patent [19]

Oshima

[11] Patent Number: 4,540,440
[45] Date of Patent: Sep. 10, 1985

[54] IVORYLIKE COMPOSITION PLATE FOR COVERING A WOODEN BASE AND A METHOD FOR PRODUCING THE SAME

[75] Inventor: Yutaka Oshima, Shizuoka, Japan

[73] Assignee: Nippon Gakki Seizo Kabushiki Kaisha, Japan

[21] Appl. No.: 609,489

[22] Filed: May 11, 1984

Related U.S. Application Data

[60] Continuation-in-part of Ser. No. 565,389, Dec. 27, 1983, abandoned, which is a division of Ser. No. 501,968, Jun. 10, 1983, Pat. No. 4,447,268, which is a continuation of Ser. No. 296,483, Aug. 26, 1981, abandoned.

[30] Foreign Application Priority Data

Sep. 2, 1980 [JP] Japan .................................. 55-121663
Dec. 8, 1980 [JP] Japan .................................. 55-172956

[51] Int. Cl.³ ............................................. C08L 89/00
[52] U.S. Cl. ..................................................... 106/148
[58] Field of Search ........................................... 106/148

[56] References Cited

U.S. PATENT DOCUMENTS

| 444,775 | 1/1891 | De Pont | 106/137 |
| 1,320,666 | 11/1919 | Bartels | 106/148 |
| 1,758,500 | 5/1930 | Christmas | 106/148 |
| 4,447,268 | 5/1984 | Oshima | 106/148 |

FOREIGN PATENT DOCUMENTS 530790 12/1940 United Kingdom ................ 106/148

OTHER PUBLICATIONS

Chem. Abst. 95: 137,391j, Gakki, May 1981.
Chem. Abst. 95: 174,388j, Gakki, May 1981.

Primary Examiner—Theodore Morris
Attorney, Agent, or Firm—Lerner, David, Littenberg, Krumholz & Mentlik

[57] ABSTRACT

An artificial ivorylike composition plate having ideal properties well suited, just like natural ivory, for covering a wooden base for key of a musical instrument is produced by dispersing non-hydrated inorganic filler in casein matrix with later hardening by folmalin.

7 Claims, 8 Drawing Figures

IVORYLIKE COMPOSITION PLATE FOR COVERING A WOODEN BASE AND A METHOD FOR PRODUCING THE SAME

BACKGROUND OF THE INVENTION

This application is a continuation-in-part of application Ser. No. 565,389 filed Dec. 27, 1983, now abandoned, which is a division of application Ser. No. 501,968, filed June 10, 1983, now U.S. Pat. No. 4,447,268, which in turn is a continuation of application Ser. No. 296,483, filed Aug. 26, 1981, now abandoned.

The present invention relates to an ivorylike composition plate for covering a wooden base and a method for producing the same, and more particularly relates to production of an ivorylike composition plate used for covering a wooden base of each key of musical instruments which has properties very close to those of a natural ivory plate.

Ivory has been highly appreciated by ones skilled in the art of keyboard musical instruments such as pianos, organs and accordions as a material for covering a wooden base of a key. Such preference for ivory is believed to be caused by, aside from the fact that ivory is well used for high class art objects, its ideal properties which suffice the following requirements for materials used for keys of musical instruments.

(a) The material should have moderate moisture absorbability so that a key can well absorb sweat on player's fingers in order to avoid undesirable finger slippage on the key during performance.

(b) The material should have moderate surface smoothness with moderate frictional resistance since these factors have a subtle influence of key touch.

(c) The material should have excellent appearance, i.e. high whitness well resistant against contamination.

(d) The material should have moderate hardness for comfortable key tough and for little abrasion even after long use.

(e) The material should have moderate workability for easy shaping in the production process.

Recent, poor supply of natural ivory having such ideal properties, however, cannot well meet the demand in the field of musical instruments. In particular, African countries, which have long been the major and rich supply source of ivory, have started to ban, or at least to impose a strong restriction on, collection of ivory through hunting in order to protect natural animals such as elephants.

In view of such a situation, synthetic resins have increasingly been used for production of keys for musical instruments since they have no problem in constant mass supply. Synthetic resin keys, however, still have several drawbacks despite their beautiful appearance and appreciable workability. For example, excessive surface smoothness of synthetic resin often causes undesirable finger slippage on keys during performance. Poor moisture abosrbability of synthetic resin connects to sweat problem which furthers the above-described finger slippage on keys. Further, relatively low hardness of synthetic resin promotes frictional abrasion of keys even after short period of use.

Use of the so-called casein plastics for such keys is thinkable. In production of the casein plastics, casein containing pigments or dyes is mixed and kneaded with water and, after molding, the mixture is hardened by treatment with formalin. Such casein plastics, however, still have some drawbacks when used for keys of musical instruments. Casein plastics cannot assure comfortable key touch. Both in wet and dry states, dimensional stability of casein plastics is insufficient as a material used for keys of musical instruments. Further, casein plastic in general lacks in massive appearance when compared with natural ivory.

SUMMARY OF THE INVENTION

It is one object of the present invention to provide an artificial material well suited for keys of musical instruments which has excellent properties very close to those of natural ivory.

It is another object of the present invention to provide an ideal artificial material usable for keys of musical instruments which assures rich, constant but freely adjustable supply in accordance with the size of demand.

In accordance with the present invention, non-hydrated inorganic filler is dispersed in the matrix of casein resin hardened with formalin.

In production, powdery, non-hydrated inorganic filler is mixed and kneaded with water and mixture so obtained is hardened, after shaping, by treatment with formalin.

DESCRIPTION OF THE PREFERRED EMBODIMENTS

Figure 1:
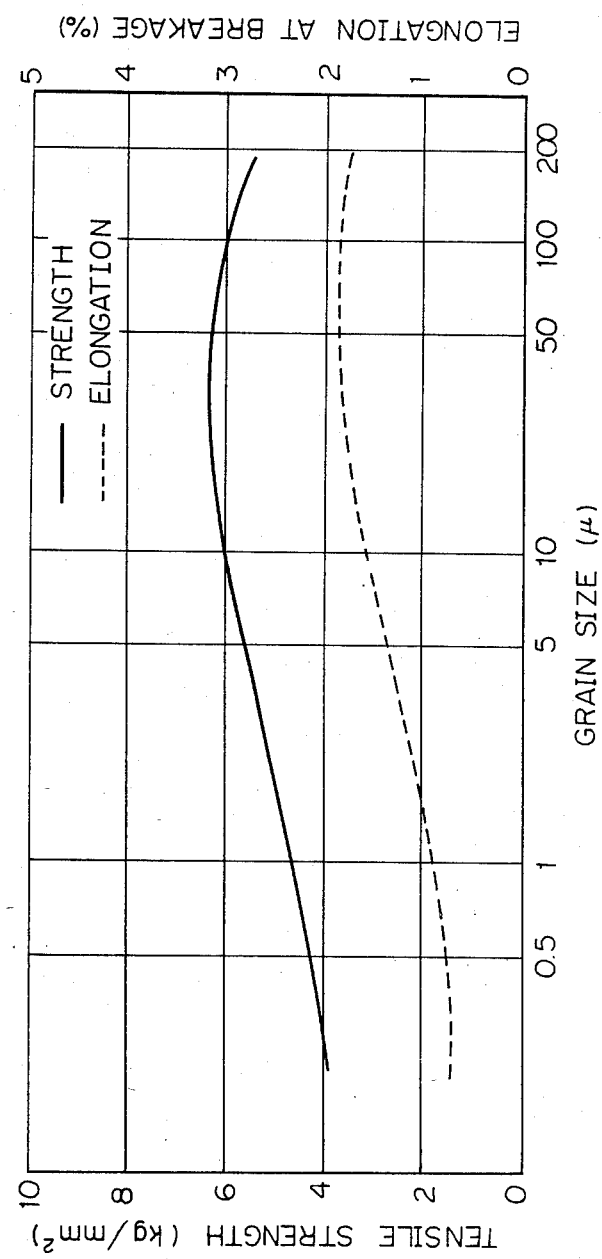
FIG. 1 is a graph for showing the relationship between the grain size of a non-hydrated inorganic filler and the tensile properties of a composition plate containing such a filler.

The present invention evolves from a basic idea of adding non-hydrated inorganic filler to the matrix of casein resin in order to remove the above-described drawbacks inherent to the conventional casein plastics whilst reserving its high moisture absorbability and excellent affinity to human skin.

In the following description, "percentage" and "part" of ingredients both generally refer to ratio in weight.

The casein resin used for this invention should preferably take the form of grains comminuated to a grain size of about 100 meshes or smaller. Any grain sizes beyond this limit would cause uneven mixing with the non-hydrated inorganic filler. Casein is a sort of phosphoprotein, i.e. a conjugated protein which is produced by mixing proteins of similar types. Its molecular weight is usually in a range from 75,000 to 375,000 and it is contained by about 3% in cow milk and by about 1% in mother milk. Casein is called rennet casein when it is coagulated mainly from cow milk by use of enzyme rennin. Whereas casein is called acid casein when it is coagulated by use of acid. For the purpose of the present invention, it is better to use rennet casein which has huge molecular construction with lots of folded branches.

The non-hydrated inorganic filler used for the present invention is preferably taken from the group consisting of silica oxide, calcium phosphate, alumina, calcium carbonate, barium sulfate and calcium sulfate.

Optical properties and dissolution in water of composition plates including various non-hydrated inorganic fillers are shown in Table 1. Ting of each comosition plate was observed for a composition containing 25 to 85 parts of the non-hydrated inorganic filler and 100 parts of casein. A composition plate of 1.5 mm thickness was used for appreciation of transparency, the composition also containing 25 to 85 parts of non-hydrated inorganic filler and 100 parts of casein.

by 10 to 200 parts, more specifically 50 to 100 parts, with respect to 100 parts of casein resin. Any amount falling short of 10 parts would not bring about the expected merit of addition. Whereas any amount beyond 200 parts would disenable smooth molding after mixing and, as a consequence, considerable lowers mechanical properties of the end product such as stiffness and strength.

The content ratio of the non-hydrated inorganic filler in the end product, i.e. the ivorylike composition plate should be in a range from 14.3 to 69.5%. More specifically, in the case of silica oxide, calcium carbonate, calcium phosphate and calcium sulfate, the content ratio should preferably be in a range from 14.3 to 53.8%. Whereas in the case of alumina and barium sulfate, the content ratio should preferably be in a range from 53.8 to 69.5%.

As described already, the composition plate in accordance with the present invention is in general used for covering the wooden base of a musical instrument key. In order to keep such a combination, separation of the

TABLE 1

| Name of filler | chemical composition | grain size ($\mu$) | Index of refraction | Tint | Transparency | Dissolution to water |
|---|---|---|---|---|---|---|
| silica oxide | $SiO_2$ | 0.02~50 | 1.54 | White | Good | None |
| Calcium Phosphate | $Ca_3(PO_4)_2$ | 0.02~0.1 | 1.52 | white | Good | None |
| Alumina | $Al_2O_3$ | 30~150 | 1.50 | white | Good | None |
| Calcium Carbonate | $CaCO_3$ | 1~50 | 1.51~1.65 | White to beige | None | None |
| Barium sulfate | $BaSO_4$ | 1~20 | 1.64 | White | A little | None |
| calcium sulfate | $CaSO_4$ | 10~50 | 1.52~1.59 | White | Good | A little |
| Calcium oxide | $CaO$ | 0.02~10 | 1.58 | White | A little | Rich |
| Magnesium oxide | $MgO$ | 40~80 | 1.74 | White | None | Rich |
| Titanium dioxide | $TiO_2$ | 0.2~50 | 2.5~2.8 | White | None | None |
| Zinc oxide | $ZnO$ | 0.2~10 | 2.0 | White | None | None |
| Calcium silicate | $Ca_2SiO_4$ $CaSiO_3$ | 5~20 | 1.5~1.6 | Beige to Grey | Good | None |
| Diatom earth | $Al_2O_3 \cdot SiO_2 \cdot Fe_2O_3$ | 40~80 | 1.4 | Cream | None | None |
| Feldspar powder | $K_2O \cdot Al_2O_3 \cdot 6SiO_2$ | 40~80 | 1.55~1.6 | Green | None | None |
| Magnesium carbonate | $MgCO_3$ | 40~150 | 1.5~1.53 | Yellow | Good | None |

Further, the grain size of the non-hydrated inorganic filler should preferably be in a range from 10 to 200$\mu$. The relationship between the grain size of a non-hydrated inorganic filler and the tensile properties of a composition plate containing such a filler is shown in FIG. 1. Grain size in $\mu$ is taken on the abscissa, tensile strength in Kg/mm$^2$ is taken on the left ordinate, and elongation at breakage in % is taken on the right ordinate. The composition plate contains 30 parts of non-hydrated inorganic filler and 100 parts of casein. It will be well understood from this graphical representation that composition plates in accordance with the present invention exhibit good tensile properties when the grain size of the non-hydrated inorganic filler is in the above-described range.

In preparation of the mixture, non-hydrated inorganic filler preferably taken from such a group is added two components of the key have to be avoided under various atmospheric conditions. To this end, the composition plate should follow the behavior of the wooden base caused by swelling and drying. As a result of a series of dry test, it was confirmed that the relative contraction of the composition plate and of the wooden base as the moisture content of the material varies is greatly swayed by the content ratio of the non-hydrated inorganic filler in the composition plate.

In the dry tests, test pieces containing various amounts of non-hydrated inorganic filler were used. One cycle of test included drying at 35° C. and 97% relative humidity for 14 hours followed by subsequent drying at 35° C. and 20% relative humidity for 10 hours. After one or two cycle of tests, the states of the test pieces were observed.

Figure 2A:
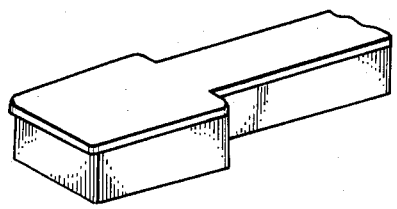
FIG. 2A to 2B are perspective views of musical instruments keys containing different amount of non-hydrated inorganic filler when dried for contraction.

When the difference in contraction between the ivorylike composition plate and the wooden base is not significant, there is no substantial deformation of the composition plate and, therefore, the key will the construction shown in FIG. 2A, in which both the wooden base and the composition plate have matching surface contact. Thus, it is desirable to maintain such a relationship through various moisture changes.

Figure 3:
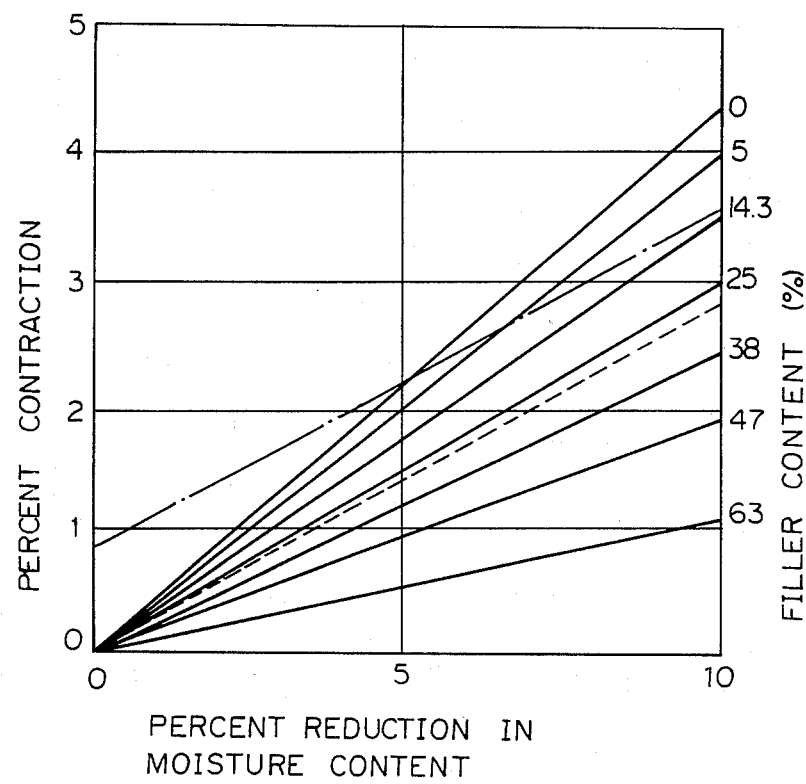
FIG. 3 is a graph for showing the relationship between percent reduction in moisture content and percent contraction of the ivorylike composition plate and the wooden base of a musical instrument key for various non-hydrated inorgaic filler contents.

FIG. 3 shows the relationship between percent reduction in moisture content and percent contraction for both the wood (dotted line) and various compositions of the ivorylike composition plate (solid lines).

Figure 2B:
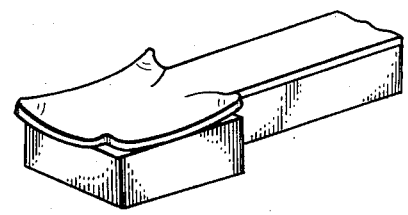
Figure 2C:
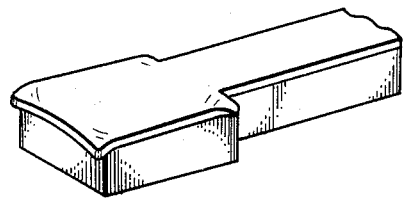

Two things can happen as the percent reduction in moisture content varies. First, it is assumed that the percent contraction of an ivorylike composition plate is larger than that of the wooden base. When a key made up of such an ivorylike composition plate and the wooden base is placed in a highly dry situation, high contraction of the composition plate generates a sort of tension in the construction of the composition plate, which thereupon warps upwards as shown in FIG. 2B. Such warping is apparently connects to undersirable separation of the composition plate from the wooden base. Though the illustration in FIG. 2B shows such warping at the corners only, worping in general takes place along the front and rear edges, too. In addition, when the percent contraction of the composition plate exceeds a critical limit determined empirically (as shown by the chain line in FIG. 3), there is also a danger of crack development in the composition plate surface. Secondly, it is assumed that the percent contraction of an ivorylike composition plate is smaller than that of the wooden base. When a key made up of such an ivorylike composition plate and the wooden base is placed in a highly dry situation, lower contraction of the composition plate generates a sort of compression in the construction plate, which thereupon warps downwards as shown in FIG. 2C. This downward warping causes no surface separation but marrs the appearance of the key.

Thus, it was confirmed that surface separation on a key occurs only when contraction of the ivorylike composition plate is larger than that of the wooden base. In this regard, FIG. 3 demonstrates that the non-hydrated inorganic filler contents higher than about 25% will prevent occurance of surface separation, since the solid lines in the graph for such filler contents are below the dotted line for the wooden base. However it was also confirmed that no cracks will be developed if the non-hydrated inorganic filler content is not lower than about 14.3%, since the solid lines for these filler contents do not project above the critical limit represented by the chain line as explained above. From the foregoing, it was confirmed that, in order to obtain such advantageous properties for the ivorylike composition plate, the minimum acceptable filler content is about 14.3%, if small surface separation is disregarded. When the filler content falls short of about 14.3%, the large difference in dry contraction between the ivorylike composition plate and the wooden base of a key tends to cause the development of cracks and contortion.

Figure 6:
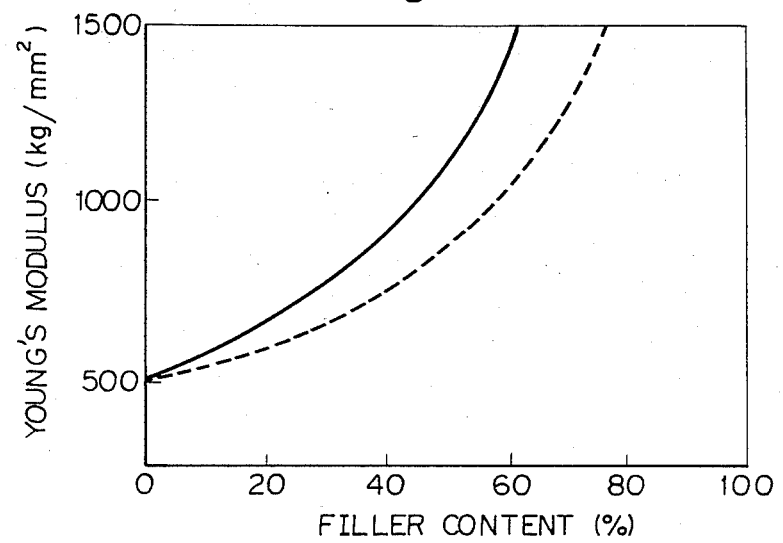
FIG. 6 is a graph demonstrating the relationship between filler content and Young's modulus of the composition plate.
Figure 4:
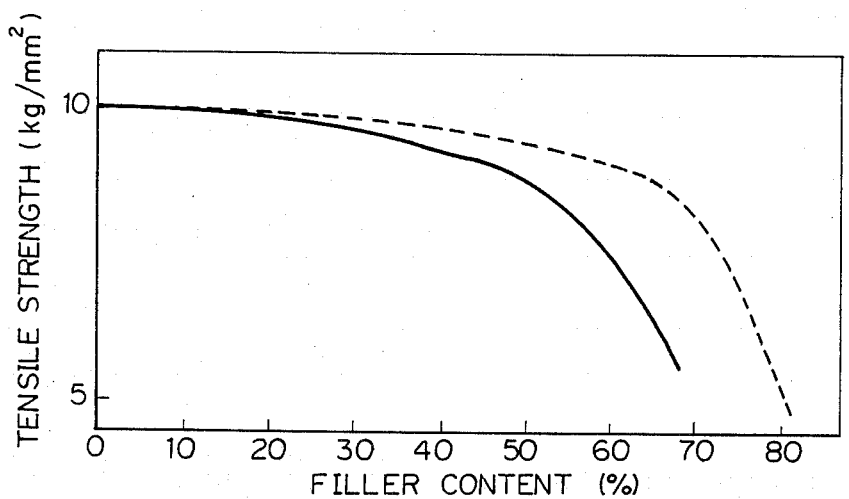
FIG. 4 is a graph demonstrating the relationship between filler content and tensile strength of the composition plate.
Figure 5:
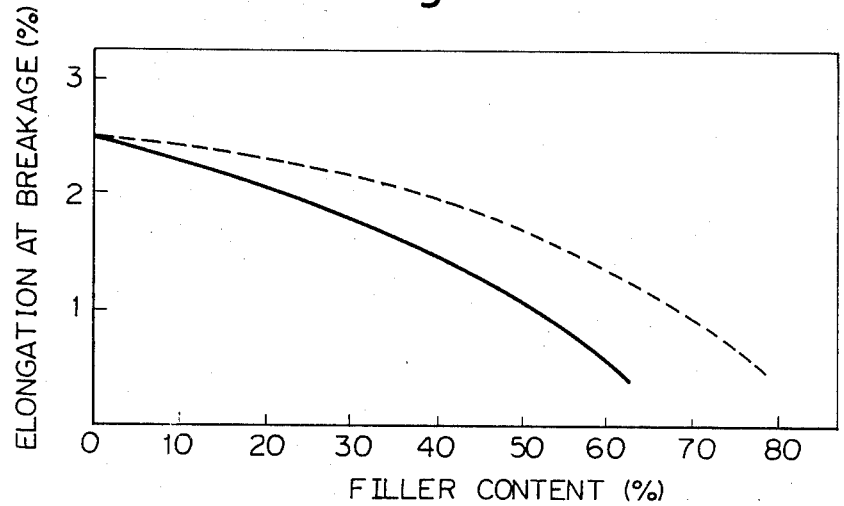
FIG. 5 is a graph demonstrating the relationship between filler content and elongation at breakage of the composition plate.

It was also confirmed that some mechanical properties of the ivorylike composition plate in accordance with the present invention vary significantly as the filler content varies. FIGS. 4 to 6 demonstrate such influence of filler content on tensile strength, elongation at breakage and Young's modulus of the composition plate for silica oxide and barium sulfate fillers. In the drawings, filler contents are taken on the abscissa and the mechanical properties are taken on the ordinate. The solid lines are for silica oxide and the dott lines are for barium sulfate. It is learned from the graphs that lowering in mechanical properties of the composition plate starts at about 53.8% in the case of the silica oxide whereas it starts at about 69.5% in the case of the barium sulfate.

In addition to the above-described ingredients, pigments such as white zinc or acid dyes may be added by 1 to 10 parts with respect to 100 parts of casein resin for the purpose of colour tone adjustment.

In production of the ivorylike composition plate in accordance with the present invention, the above-described ingredients are mixed and kneaded with, for example, 10 to 40 parts of water with respect to 100 parts of casein resin in the mixture. Thereafter, the mixture is left for 5 to 24 hours at the room temperature in order to promote swelling of the casein resin for better shaping.

Shaping of the mixture is carried out by extrusion, mechanical press or rolling followed by mechanical press. Shaping by extrusion is carried out with a pressure from about 100 to about 200 kg/cm$^2$. Temperature in the extruder is adjusted so that it should have a rising gradient from the inlet end of the cylinder to the die head over the range of about 20° to 100° C. Shaping by mechanical press is carried out with a pressure of 100 to 200 kg/cm$^2$ and at a temperature from 85° to 95° C.

Next, the shaped composition is impregnated with formaldehyde or formalin of 3 to 10% concentration at a temperature close to the room temperature for hardening of the casein resin. Period of the impregnation varies depending on the type of the shaped composition. When the shaped composition takes the form of a plate for covering the wooden base of a key, the period is about 6 days for 3 mm. thickness, about 16 days for 5 mm. thickness, and about 50 days for 10 mm. thickness.

After the hardening, the hardened composition is heated for solidification. If required, proper machining such as cutting or grinding is applied to the solidified composition. The ivorylike composition block thus obtained may solely form musical instrument keys. In general, however, the ivorylike composition is further shaped into a plate which is adapted for covering the wooden base of a key. It is also employable to colour the ivorylike composition block or plate in order to form a black key. However, when the rich whiteness of the end product is taken into consideration, it is advantageous to use them for white keys.

In accordance with the present invention, an artificial material for keys of musical instruments having properties very close to those of natural ivory is produced by mixing and kneading powdery casein resin and non-hydrated inorganic filler with water, and hardening the mixture after shaping by treatment with formalin. The ivorylike composition plate so produced is accompanied with the following excellent properties.

(a) The composition plate exhibits about 10% moisture absorption when immersed in water of 25° C. temperature for 24 hours. Such high level of moisture absorption allows keys well absorb sweat on players fingers. As a result, undesirable finger slippage on keys during performance can be well prevented.

(b) Keys covered by the composition plate have comfortable touch, massive appearance and moderate frictional resistance which correspond to those of natural ivory keys.

(c) The composition can freely be coloured as desired either during or after the production.

(d) Both in wet and dry states, the composition plate has excellent dimensional stability. Increased hardness is also assured.

EXAMPLES

Example 1

A kneaded mixture including the ingredients shown in Table 2 was prepared by means of a crush mixer. Then the mixture was left for 12 hours at the room temperature for swelling of the casein resin.

TABLE 2

| Ingredients | Parts |
|---|---|
| Rennet casein of 150~250 mesh grain size | 100 |
| Silicon oxide | 75 |
| Water | 30 |

The mixture was next placed in a metallic mold for heat pressing at 95° C. temperature and with 150 kg/cm$^2$ pressure for shaping. The shaped composition was impregnated with 5% formalin solution for hardening and an ivorylike composition plate of 50 mm.×200 mm.×5 mm. size was obtained. It was confirmed by tests that the ivorylike composition plate was accompanied with the following properties.

| Specific gravity | 1.63 |
|---|---|
| Rockwell hardness (M-scale) | Hr(M)85 90 (20° C., 60%) |
| Moisture absorption after 24 hours immersion in water of 25° C. | 5~6% |
| Bending strength | 5~7 kg/mm$^2$ |
| Bending elasticity | 600~800 kg/mm$^2$ |
| Heat conductivity | 0.35~Kcal/m hr. °C. |
| Static coefficient of friction at 23° C., 35% (deer skin used) | dry state 0.2~0.25 wet state 0.75~0.80 |
| Compressive strength | 40~50 kg/mm$^2$ |

For composition, a similar casein plate was prepared in the same way using the ingredients shown in Table 2 except for silicon oxide. The casein plate was found to have the following properties.

| Specific gravity | 1.34 |
|---|---|
| Rockwell hardness | Hr(M)85 90 (20° C., 60%) Hr(M)15 (after immersion in water of 25° C.) |
| Bending strength | 7~8 kg/mm$^2$ |
| Bending elasticity | 500~640 kg/mm$^2$ |
| Heat conductivity | 0.18 Kcal/m hr. °C. |
| Static coefficient of friction at 23° C. 35% (deer skin used) | dry state 0.2~0.25 wet state 0.75~0.80 |
| Compressive strength | 19~30 kg/mm$^2$ |
| Tensile strength | 8 kg/mm$^2$ |

These data clearly indicate that addition of non-hydrated inorganic filler, i.e. sililcon oxide, assures significant improvement in properties of the product.

Example 2

As shown in Table 3, a wide variety of non-hydrated inorganic fillers were separately added to casein resin and obtained mixtures were processed just as in Example 1. Properties of the products were tested in the same way as in Example 1 and the results are shown in Table 4.

TABLE 3

| Sample No. | Name of the filler | Chemical composition | Parts per 100 parts of casein resin |
|---|---|---|---|
| 1 | Silicon Oxide | SiO$_2$ | 75 |
| 2 | Calcium Phosphate | Ca$_3$(PO$_4$)$_2$ | 50 |
| 3 | Alumina | Al$_2$O$_3$ | 75 |
| 4 | Calcium carbonate | CaCo$_3$ | 75 |
| 5 | Barium Sulfate | BaSO$_4$ | 50 |
| 6 | Calcium Sulfate | CaSO$_4$ | 50 |

TABLE 4

| Sample No. | specific gravity | Hardness Hr (M) | Moisture absorption | Heat conductivity Kcal/m Hr °C. | Static coefficient of friction dry | Static coefficient of friction wet |
|---|---|---|---|---|---|---|
| 1 | 1.63 | 85~90 | 5~6 | 0.35 | 0.20~0.25 | 0.75~0.80 |
| 2 | 1.66 | 70~75 | 7~8 | 0.30 | " | 0.80~0.85 |
| 3 | 1.85 | 85~95 | 5~6 | 0.40 | " | " |
| 4 | 1.71 | 75~80 | " | 0.35 | " | " |
| 5 | 1.75 | 70~75 | 6~7 | 0.30 | " | 0.65~0.70 |
| 6 | 1.64 | " | 7~8 | " | " | 0.80~0.85 |

These data well indicate that addition of the enlisted non-hydrated inorganic fillers assures significant improvement in various properties of the product.

I claim:

1. An ivorylike composition plate for covering a wooden base comprising
   casein matrix hardened with folmaldehyde and
   from about 14.3 to about 69.5% by weight of non-hydrated inorganic filler selected from a group consisting of silica oxide, calcium phosphate, alumina, calcium carbonate, barium sulfate and calcium sulfate.

2. An ivorylike composition plate as claimed in claim 1 in which
   the grain size of said non-hydrated inorganic filler is in the range from 10 to 200μ.

3. An ivorylike composition plate as claimed in claim 1 or 2 further comprising a component selected from the group consisting of of pigments and acid dyes.

4. A method for producing an ivorylike composition plate for covering a wooden base comprising the steps of
   mixing and kneading casein resin and non-hydrated inorganic filler selected from a group consisting of silica oxide, calcium phosphate, alumina, calcium carbonate, barium sulfate and calcium sulfate, with water to form a mixture;
   shaping said mixture to a shaped plate; and
   impregnating said shaped plate with formaldehyde to harden said casein resin, said non-hydrated inorganic filler being present in said mixture in an amount sufficient for providing an ivorylike composition plate containing from about 14.3 to about 69.5% by weight of said non-hydrated inorganic filler.

5. A method as claimed in claim 4 in which
   10 to 200 parts by weight of said non-hydrated filler is mixed with 100 parts by weight of said casein resin.

6. A method as claimed in claim 5 in which 1 to 10 parts by weight of pigment is further added to 100 parts by weight of said casein resin.

7. A method as claimed in claim 5 in which 1 to 10 parts by weight of acid dye is further added to 100 parts by weight of said casin resin.

* * * * *